(12) United States Patent
Sanchez et al.

(10) Patent No.: US 7,774,743 B1
(45) Date of Patent: Aug. 10, 2010

(54) QUALITY INDEX FOR QUALITY ASSURANCE IN SOFTWARE DEVELOPMENT

(75) Inventors: Penny L. Sanchez, Lenexa, KS (US); Ton Van Pham, Overland Park, KS (US); Sharon D. Lee, Lee's Summit, MO (US); Olivia M. Sketers, Lenexa, KS (US); Nicolle R. Kearney, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1496 days.

(21) Appl. No.: 11/073,255

(22) Filed: Mar. 4, 2005

(51) Int. Cl.
 *G06F 9/44* (2006.01)
(52) U.S. Cl. .................. 717/103; 717/101; 717/102
(58) Field of Classification Search .................. None
See application file for complete search history.

(56) References Cited

U.S. PATENT DOCUMENTS

| | | | |
|---|---|---|---|
| 5,548,506 A | 8/1996 | Srinivasan | |
| 6,324,647 B1 | 11/2001 | Bowman-Amuah | |
| 6,662,357 B1 | 12/2003 | Bowman-Amuah | |
| 6,895,382 B1 | 5/2005 | Srinivasan et al. | |
| 7,051,036 B2 | 5/2006 | Rosnow et al. | |
| 7,117,161 B2 * | 10/2006 | Bruce | 705/8 |
| 7,139,999 B2 | 11/2006 | Bowman-Amuah | |
| 7,430,498 B2 | 9/2008 | Butterfield et al. | |
| 7,559,049 B1 | 7/2009 | Hemmat et al. | |
| 2001/0051913 A1 | 12/2001 | Vashistha et al. | |
| 2002/0026630 A1 | 2/2002 | Schmidt et al. | |
| 2002/0042731 A1 | 4/2002 | King, Jr. et al. | |
| 2002/0059512 A1 | 5/2002 | Desjardins et al. | |
| 2003/0033191 A1 | 2/2003 | Davies et al. | |
| 2004/0143811 A1 | 7/2004 | Kaelicke et al. | |
| 2004/0243968 A1 | 12/2004 | Hecksel | |
| 2004/0255265 A1 * | 12/2004 | Brown et al. | 717/101 |
| 2005/0114829 A1 * | 5/2005 | Robin et al. | 717/101 |
| 2005/0144592 A1 * | 6/2005 | Below et al. | 717/124 |
| 2005/0216882 A1 * | 9/2005 | Sundararajan et al. | 717/104 |
| 2005/0289503 A1 * | 12/2005 | Clifford | 717/101 |
| 2006/0112371 A1 * | 5/2006 | Oikawa et al. | 717/114 |

(Continued)

OTHER PUBLICATIONS

Ton Van Pham, Visibility Index for Quality Assurance in Software Development, Filing Date—Mar. 4, 2005, U.S. Appl. No. 11/072,185, Specification (27 pgs.), Drawings (4 sheets).

(Continued)

*Primary Examiner*—Tuan Q Dam
*Assistant Examiner*—Isaac T Tecklu

(57) ABSTRACT

A system for defining a quality index is provided. The system includes a process compliance portion wherein process compliance aspects of a deliverable for a project are scored. Calculating an average of the scores in the process compliance portion gives a process compliance average score. Multiplying the process compliance average score by a weighting factor gives a weighted process compliance average score. The system also includes a content quality compliance portion wherein content quality aspects of the deliverable are scored. Calculating an average of the scores in the content quality compliance portion gives a content quality compliance average score. Multiplying the content quality compliance average score by a second weighting factor gives a weighted content quality compliance average score. Adding the weighted average scores gives the quality index for a deliverable. Quality indices for deliverables can be combined to derive quality indices for steps, phases, projects, and other entities.

18 Claims, 5 Drawing Sheets

| 20 | SYSTEM REQUIREMENTS DOCUMENT | |
|---|---|---|
| 30 | PROCESS COMPLIANCE | |
| 40 | Document Compliance | |
| 42 | Created on schedule | 0 |
| 44 | Used the right template | 0 |
| 46 | Correctly named | 100 |
| 48 | Correctly stored | 100 |
| 50 | Procedure Compliance | |
| 52 | Meeting minutes created | 100 |
| 54 | Issue log created | 0 |
| 56 | Action item list created | 100 |
| 62 | Process Compliance Average Score | 57.14 |
| 64 | Weight | 50% |
| 66 | Weighted Score | 28.57 |
| 70 | CONTENT QUALITY COMPLIANCE | |
| 72 | Completeness | 100 |
| 74 | Traceability | 92 |
| 82 | Content Quality Compliance Average Score | 96 |
| 84 | Weight | 50% |
| 86 | Weighted Score | 48 |
| 90 | QUALITY INDEX | 76.57 |

10

U.S. PATENT DOCUMENTS

2006/0123389 A1\* 6/2006 Kolawa et al. ............... 717/101
2006/0129439 A1 6/2006 Arlt et al.

OTHER PUBLICATIONS

Merzad Hemmat, Defining and Sizing Feasible Approaches to Business Needs Within an Integrated Development Process, Filing Date—May 5, 2003, U.S. Appl. No. 10/429,615, Specification (33 pgs.), Drawings (3 sheets).

Merzad Hemmat, Methods for Discovering Functional and System Requirements in an Integrated Development Process, Filing Date—Aug. 18, 2003, U.S. Appl. No. 10/643,334, Specification (29 pgs.), Drawings (4 sheets).

Office Action dated May 6, 2009, 16 pages, U.S. Appl. No. 11/072,185, filed Mar. 4, 2005.

Final Office Action dated Oct. 15, 2009, 22 pages, U.S. Appl. No. 11/072,185, filed Mar. 4, 2005.

Advisory Action dated Dec. 24, 2009, 3 pages, U.S. Appl. No. 11/072,185, filed Mar. 4, 2005.

Notice of Allowance dated Feb. 17, 2010, 20 pages, U.S. Appl. No. 11/072,185, filed Mar. 4, 2005.

Kwak, et al., "Project Management Journal v31n2," 13 pages, Jun. 2000.

Sanchez, et al., "Project Management Journal v35n1," 16 pages, Apr. 2004.

Cooper, et al., "Research Technology Management v43n2," 22 pages, Mar./Apr. 2000.

Simpson, et al., "Transactions of AACE International," 9 pages, 1996.

Coffin, et al., "IIE Transactions, v28, n2," 14 pages Feb. 1996.

Davis, et al., "DISAM Journal, 27, 1, 1," 35 pages, 2004.

\* cited by examiner

| | | |
|---|---|---|
| 20 → | SYSTEM REQUIREMENTS DOCUMENT | |
| 30 → | PROCESS COMPLIANCE | |
| 40 → | Document Compliance | |
| 42 → | Created on schedule | 0 |
| 44 → | Used the right template | 0 |
| 46 → | Correctly named | 100 |
| 48 → | Correctly stored | 100 |
| 50 → | Procedure Compliance | |
| 52 → | Meeting minutes created | 100 |
| 54 → | Issue log created | 0 |
| 56 → | Action item list created | 100 |
| | | |
| 62 → | Process Compliance Average Score | 57.14 |
| 64 → | Weight | 50% |
| 66 → | Weighted Score | 28.57 |
| | | |
| 70 → | CONTENT QUALITY COMPLIANCE | |
| 72 → | Completeness | 100 |
| 74 → | Traceability | 92 |
| | | |
| 82 → | Content Quality Compliance Average Score | 96 |
| 84 → | Weight | 50% |
| 86 → | Weighted Score | 48 |
| | | |
| 90 → | QUALITY INDEX | 76.57 |

QUALITY INDEX FOR QUALITY ASSURANCE IN SOFTWARE DEVELOPMENT

CROSS-REFERENCE TO RELATED APPLICATIONS

This application contains subject matter related to U.S. patent application Ser. No. 10/429,615, filed May 5, 2003 and entitled "Defining and Sizing Feasible Approaches to Business Needs Within an Integrated Development Process", and to U.S. patent application Ser. No. 10/643,334, filed Aug. 18, 2003 and entitled "Method For Discovering Functional and System Requirements In An Integrated Development Process", and to U.S. patent application Ser. No. 11/072,185, entitled "Visibility Index for Quality Assurance in Software Development" filed on Mar. 4, 2005, all of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to project management. More particularly, embodiments of the present invention provide for the calculation of a quality index for software development projects.

BACKGROUND OF THE INVENTION

Many enterprises implement quality assurance programs or similar efforts to ensure that their products meet the highest possible standards. In the area of software development, in particular, numerous guidelines exist for assuring the quality of development projects. For example, the ISO 9001 standard and the Capability Maturity Model Integration (CMMI) model both provide guidelines for conducting high quality software development projects.

CMMI designates five levels of organization and maturity in an enterprise's software development processes, with each level having a different set of requirements that must be met for CMMI certification to be achieved. The five CMMI levels, in order of least organized and least mature to most organized and most mature are initial, repeatable, defined, managed, and optimizing. It is generally desirable for an enterprise to reach the highest CMMI level possible.

Existing standards and guidelines such as CMMI typically provide general goals that, if met, are likely to result in a high quality product. Details on achieving those goals are typically not offered and typically must be developed by the enterprises following the standards.

SUMMARY OF THE INVENTION

An embodiment of the invention is a system for defining a quality index for a deliverable for a project. The system includes a process compliance portion and a content quality compliance portion. In the process compliance portion, process compliance aspects of the deliverable are given a first score when a process compliance aspect is satisfied and a second score when a process compliance aspect is not satisfied. A process compliance average score is then derived by calculating an average of the scores obtained in the process compliance portion. A weighted process compliance average score is then derived by multiplying the process compliance average score by a first weighting factor. In the content quality compliance portion, content quality aspects of the deliverable are given scores relative to their satisfaction of standards. A content quality compliance average score is then derived by calculating an average of the scores obtained in the content quality compliance portion. A weighted content quality compliance average score is then derived by multiplying the content quality compliance average score by a second weighting factor. The quality index is then derived by adding the weighted process compliance average score and the weighted content quality compliance average score.

An alternative embodiment is a method for determining a quality index for a deliverable for a project. The method consists of performing a process compliance check and performing a content quality compliance check. In the process compliance check, process compliance aspects of the deliverable are given a first score when a process compliance aspect is satisfied, a second score when a process compliance aspect is not satisfied, and a third score when a process compliance aspect is partially satisfied. Further steps in the process compliance check include deriving a process compliance average score by calculating an average of the scores obtained in the process compliance check and deriving a weighted process compliance average score by multiplying the process compliance average score by a first weighting factor. In the content quality compliance check, content quality aspects of the deliverable are given scores that reflect the degree to which the content quality aspects meet their standards. Further steps in the content quality compliance check include deriving a content quality compliance average score by calculating an average of the scores obtained in the content quality compliance check and deriving a weighted content quality compliance average score by multiplying the content quality compliance average score by a second weighting factor. The quality index is then derived by adding the weighted process compliance average score and the weighted content quality compliance average score.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a diagram of a table that might be used to calculate a quality index according to one embodiment of the present disclosure.

DETAILED DESCRIPTION OF THE PREFERRED EMBODIMENTS

Figure 2:
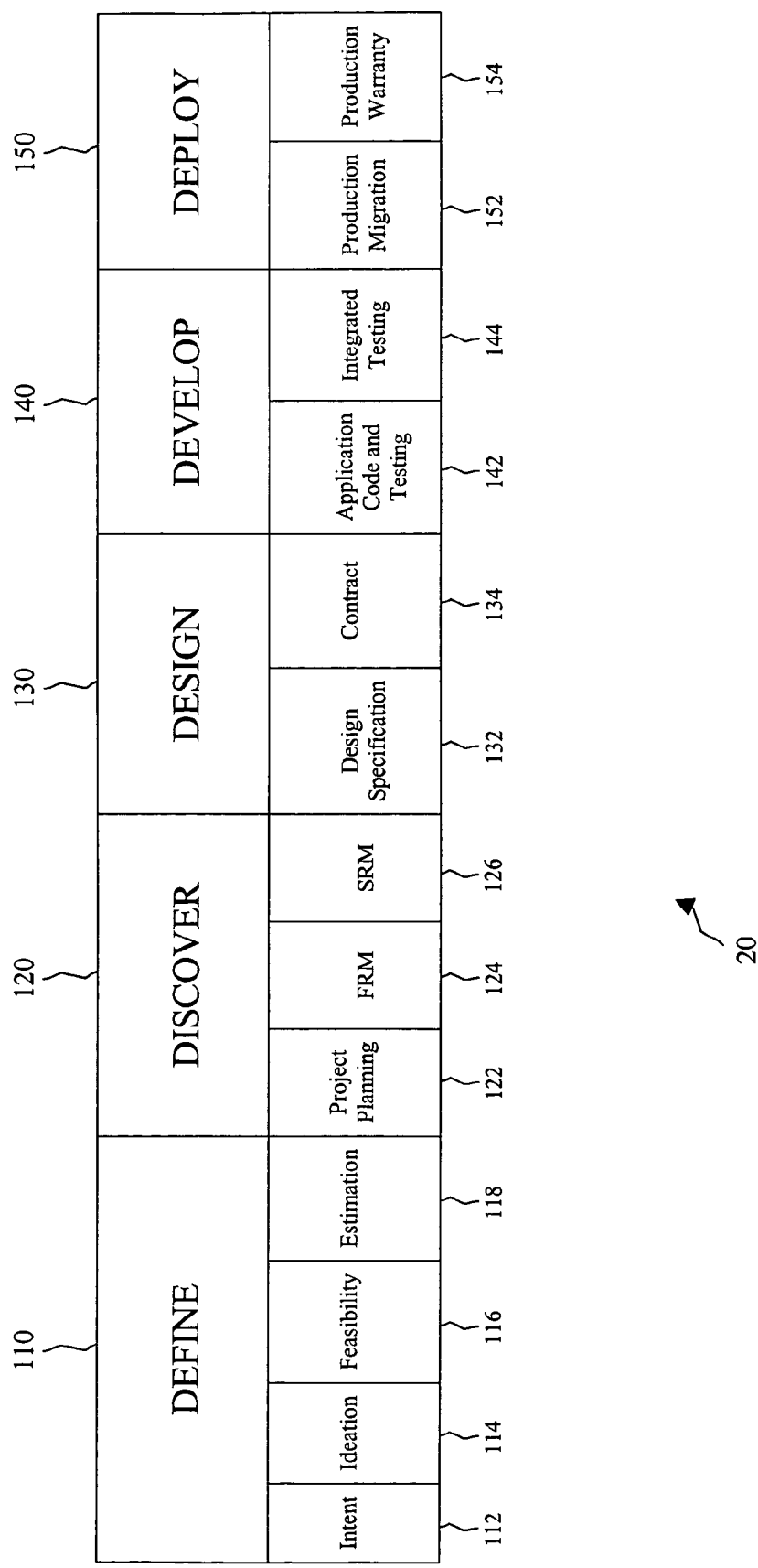
FIG. 2 is a block diagram of an Enterprise Development Process according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

An enterprise conducting multiple projects, such as software development projects, might wish to keep track of the status of the projects for quality assurance purposes. In an embodiment, a single number that can be referred to as the quality index can be derived to indicate the health of a project and of the components within a project. The quality index can show how projects are doing compared to each other and can also show trends of whether or not the overall quality of all projects in an enterprise is improving. The quality index can also be used as a basis for a decision on whether to proceed with a project. For example, a project with a quality index below a predetermined level might be a candidate for abandonment.

In an embodiment, the quality index is derived through an evaluation of whether a project is following an enterprise's standards and quality assurance policies. Those standards and policies might be completely internally generated or might be partially or completely based on CMMI, ISO 9001, or other published guidelines. In particular, the quality index might serve as an indication of how well an organization is meeting the certification requirements for a desired CMMI level.

In an embodiment, an enterprise might break its projects down into smaller units that can be referred to as phases. The phases, in turn, can consist of smaller units that can be referred to as steps. The steps might be made up of a set of well-defined units of work that can be referred to as deliverables. In other embodiments, project hierarchies with other numbers of levels could be used and other terms for the components at each hierarchical level could be used.

A quality checkpoint can occur at the end of each step of a project, at the end of each phase of a project, or at other milestones or other interim points in a project. At each checkpoint, a quality index can be calculated for each deliverable, step, phase, or other portion of the project completed to that point. A decision can then be made, based heavily on the quality index, whether to continue with the project. The schedule, the cost, and other unresolved issues for the project can also factor into the decision.

A quality evaluator might perform evaluations at each quality checkpoint that provide data for the calculations of the quality indices. The quality evaluator would typically have specialized skills to perform in-depth verification and validation processes. To maintain independence and objectivity, the quality evaluator would typically not be a member of a team responsible for providing a deliverable.

In an embodiment, the quality evaluator follows a standardized procedure to derive a quality index for each deliverable. The quality indices for all of the deliverables in a step are averaged to derive a quality index for the step. The quality indices for all of the steps in a phase are averaged to derive a quality index for the phase. The quality indices for all of the phases in a project are averaged to derive a quality index for the project. The quality indices for all projects currently underway in all business units can be averaged to generate a single number that can be reported at an executive level to indicate an overall project status for an entire enterprise. Quality indices might also be calculated for all projects in a group, a team, a business unit, or some other combination of projects.

The standardized procedure for deriving a quality index for a deliverable can consist of a process compliance check and a content quality compliance check. A score for process compliance and a score for content quality compliance can each be weighted and then combined to give the single quality index.

The process compliance check typically deals with "yes or no" questions on whether the agreed-upon procedures are being followed. The questions might concern whether the necessary deliverables are present, whether they are named correctly and stored correctly, or whether they have the proper accompanying artifacts. For some procedures, one of only two possible scores can be given, indicating that the procedure is being followed completely or is not being followed at all. For example, a "yes" answer could be given a high score (such as 100) and a "no" answer could be given a low score (such as 0).

For other procedures, one of a larger, but still discontinuous, set of scores can be given. For example, a high score (such as 100) could be given if the procedure is being followed completely, an intermediate high score (such as 75) could be given if the procedure is being followed somewhat less than completely, an intermediate low score (such as 25) could be given if the procedure is being followed only partially, and a low score (such as 0) could be given if the procedure is not being followed at all. In other embodiments, other sets of scores and other guidelines for assigning the scores could be used.

The content quality compliance check rates the quality of a deliverable. In an embodiment of the content quality compliance check, scores in a continuous range between 0 and 100 are assigned or calculated to indicate how well a deliverable meets its quality standards or requirements. In other embodiments, other continuous ranges of scores could be used. Defects in a deliverable or a portion of a deliverable can be categorized as major, minor, or cosmetic, with each type of defect having a different weighting factor. A scoring system such as this can provide precise standards by which to do the content quality compliance check so that the check is as objective as possible.

The process compliance check and the content quality compliance check are each made up of one or more elements or aspects that are evaluated to determine the level of process compliance and the level of content quality compliance that have been achieved for a deliverable. In one embodiment, the same set of process compliance elements and the same set of content quality compliance elements are used for all deliverables in a step. In other embodiments, different deliverables might have different sets of process compliance elements and content quality compliance elements.

FIG. 1 illustrates a table 10 that might be used in deriving a quality index for a deliverable. In this case, the deliverable is a systems requirement document 20, but a similar table might be used for other deliverables. A score can be assigned for a process compliance section 30 and for a content quality compliance section 70. In this example, the process compliance section 30 consists of a document compliance section 40 and a procedure compliance section 50. In other embodiments, other subsections could be present under the process compliance section 30 and/or the content quality compliance section 70.

Under document compliance 40, scores of either 0 or 100 can be assigned based on whether or not certain required elements or aspects of a systems requirement document 20 are present in the document. In this case, the required elements or aspects are 'created on schedule' 42, 'used the right template' 44, 'correctly named' 46, and 'correctly stored' 48. For other deliverables, the same or different elements or aspects could be used.

In this example, a score of 0 has been given to 'created on schedule' 42, indicating that the document was not created on schedule. A score of 0 has been given to 'used the right template' 44, indicating that the correct template was not used. A score of 100 has been given to 'correctly named' 46, indicating that the document was properly named. A score of 100 has been given to 'correctly stored' 48, indicating that the document was properly stored.

Under procedure compliance 50, scores of either 0 or 100 can be assigned based on whether or not certain required procedures were performed. In this case, the procedures are 'meeting minutes created' 52, 'issue log created' 54, and 'action item list created' 56. For other deliverables, the same or different elements or aspects could be used.

In this example, a score of 100 has been given to 'meeting minutes created' 52, indicating that the meeting minutes were created. A score of 0 has been given to 'issue log created' 54, indicating that the issue log was not created. A score of 100 has been given to 'action item list created' 56, indicating that the action item list was created.

The elements or aspects under process compliance 30 can be averaged to create a process compliance average score 62. In this case, the process compliance average score 62 is 57.14 ((0+0+100+100+100+0+100)/7). The process compliance average score 62 is then multiplied by a weight 64. In this embodiment, the weight 64 is 50%, but in other embodiments other weights could be used. When the process compliance average score 62 of 57.14 is multiplied by the weight 64 of 50%, a weighted score 66 of 28.57 is derived.

Under content quality compliance 70, scores with a range between 0 and 100 can be assigned based on the degree to which certain elements or aspects meet the standards that have been set for those elements or aspects. In this case, the elements are the completeness 72 of the systems requirement document 20 and the traceability 74 of the systems requirement document 20. For other deliverables, the same or different elements or aspects could be used. For example, aspects such as readability, accuracy, testability, consistency, efficiency, flexibility, maintainability, portability, and usability, while not shown in FIG. 1, could be evaluated under content quality compliance 70.

In this example, a score of 100 has been given to 'completeness' 72, indicating that the document 20 is totally complete. A score of 92 has been given to 'traceability' 74, indicating that the document has been determined to have less than a complete level of traceability 74. The scores under content quality compliance 70 can be based on a subjective judgment by a quality evaluator or can be assigned using a formula as described below.

The items under content quality compliance 70 can be averaged to create a content quality compliance average score 82. In this case, the content quality compliance average score 82 is 96 ((100+92)/2). The content quality compliance average score 82 is then multiplied by a weight 84. In this embodiment, the weight 84 is 50%, but in other embodiments other weights could be used. When the content quality compliance average score 82 of 96 is multiplied by the weight 84 of 50%, a weighted score 86 of 48 is derived.

The process compliance weight 64 and the content quality compliance weight 84 are intended to indicate the relative importance or value of the process compliance section 30 and the content quality compliance section 70, respectively. In the above example, the process compliance section 30 and the content quality compliance section 70 were assumed to have the same relative importance, so the two sections were given the same weight (i.e., 50%). In other embodiments, other weights, typically adding to 100%, could be given to the process compliance section 30 and the content quality compliance section 70 to indicate other relative values of the two sections.

The process compliance weighted score 66 and the content quality compliance weighted score 86 can be added to derive a quality index 90 for the system requirements document 20 deliverable. In this case, the quality index 90 is 76.57 (28.57+48).

The scores for the elements or aspects under content quality compliance 70 can be calculated through the use of a formula so that subjective judgments in the derivations of the scores are reduced. In the example above, the scores for completeness 72 and traceability 74 might be calculated by a formula rather than being subjectively assigned. For other deliverables, other elements or aspects might be scored, but a formula having the same general format might be used for any element or aspect under the content quality compliance section 70.

In an embodiment, values to be inserted into the formula are obtained by counting the number of major defects, the number of minor defects, and the number of cosmetic defects for a content quality compliance 70 element or aspect. The definitions of "major", "minor", and "cosmetic" can differ for different elements or aspects. The quantity of each type of defect is multiplied by a different weighting factor. These weighted defect values are then added together and the sum is divided by a divisor, which can vary based on the phase a project is in. In an embodiment, the divisor is the total number of requirements for the content quality compliance 70 element when the project is in a Discover phase, as described below, and the divisor is the total number of function points in the phase when the project is in a Design, Develop, or Deploy phase, as described below. When the sum is divided by the divisor, the resulting value is multiplied by 100 and that result is subtracted from 100 to give a score for the content quality compliance 70 element.

This can be summarized by the following formula:

$$\text{score} = 100 - ((((A \times X) + (B \times Y) + (C \times Z))/D) \times 100)$$

where
$A$ = the number of major defects
$B$ = the number of minor defects
$C$ = the number of cosmetic defects
$X$ = the weighting factor for major defects
$Y$ = the weighting factor for minor defects
$Z$ = the weighting factor for cosmetic defects
$D$ = a divisor, which can be the total number of requirements for the element or the total number of function points for a phase of a project.

A score for the traceability element 74 can be calculated as an example. For the traceability element 74, non-traceable requirements can be classified as major defects, requirements that are unclear to trace or that need additional information can be classified as minor defects, and requirements with spelling errors can be classified as cosmetic defects. A quality evaluator's analysis of the traceability element 74 might reveal 6 major defects, 16 minor defects, and 8 cosmetic defects out of a total of 200 requirements for the traceability element 74. In this example, major defects are given a weight of 1.0, minor defects are given a weight of 0.5, and cosmetic defects are given a weight of 0.25. Inserting these values into the above formula gives the following:

$$score=100-((((6\times1.0)+(16\times0.5)+(8\times0.25))/200)\times 100)=92.$$

In this example, then, a score of 92 is derived for the traceability element 74. This score can be inserted into the appropriate location in the table 10 of FIG. 1. Similar calculations can be performed for the other elements or aspects under the content quality compliance section 70 of the system requirements document deliverable 20 and for the content quality compliance sections of other deliverables. Use of such a formula promotes consistency among the content quality compliance scores assigned by different quality evaluators and can allow comparisons to be made between similar deliverables in different projects.

FIG. 1 can be an embodiment of an automated, graphical user interface-based scorecard that might assist a quality evaluator in performing an evaluation objectively and consistently. Radio buttons or similar selection mechanisms might be present in the scorecard for each element or aspect in a process compliance section 30 to assist the quality evaluator in indicating whether or not an element or aspect is present. Text entry areas might be present in the scorecard into which a quality evaluator can enter values for the quantities of major, minor, and cosmetic defects that were found for each element or aspect under a content quality compliance section 70. The scorecard might then automatically calculate a score for each content quality element or aspect using the formula listed above.

When the scores for all elements or aspects in a deliverable have been manually entered or automatically calculated, the scorecard might automatically calculate a quality index for the deliverable using the procedure described above. The scorecard might then use several deliverable quality indices to calculate a step quality index, use several step quality indices to calculate a phase quality index, use several phase quality indices to calculate a project quality index, and use several project quality indices to calculate an enterprise-wide quality index for all projects.

The quality evaluator might communicate the results of an evaluation to a project manager. Alternatively, the quality evaluator might communicate the results of an evaluation to a quality advisor who might then assist a project manager or a project team in complying with standards and resolving defects. The quality advisor can facilitate project quality definition and planning, provide project collaboration, and oversee quality assurance activities throughout the lifecycle of a project. A quality advisor would typically be assigned to high-visibility projects.

The quality advisor would typically be heavily involved in the planning stages of a project where deliverables for the project are being determined, personnel are being assigned, and a schedule is being set. The quality advisor might also participate in project reviews, quality checkpoints, quality checkpoint meetings, status meetings, and other activities throughout the life of a project. This involvement can allow the quality advisor to keep the project team on track to meet CMMI, ISO 9001, or other guidelines. In particular, the quality advisor might assist an organization in meeting the certification requirements for a desired CMMI level.

A project visibility index (PVI) might be used to determine whether a quality advisor is assigned to a project. When the PVI for a project is above a predefined threshold, a quality advisor might be assigned to the project to consult with a project team and ensure that the standards set for the project are being followed. Discussion of how a PVI might be calculated and then used to determine if a quality advisor is assigned to a project is provided in U.S. patent application Ser. No. 11/072,185, filed Mar. 4, 2005 and entitled "Visibility Index for Quality Assurance in Software Development", which is incorporated herein by reference. For low-visibility projects where a quality advisor is not assigned or where a quality index is not calculated, a project manager or account manager might be responsible for seeing that guidelines are being followed and non-compliance issues have been resolved.

After quality indices for multiple deliverables have been calculated in the manner described above, the deliverable quality indices can be combined in ways other than by step, by phase, or by project. For example, quality indices can be assigned by business unit, supplier, implementer, project or account manager, project type, or other views. The quality indices can be stored in a database or a similar data store to facilitate the creation of queries that can generate a desired view of quality index data. If a particular view shows that defects of a particular type are consistently associated with a particular entity or a particular step or document, the quality advisor can work with the appropriate entity to assist in determining the problem and discovering a solution.

The quality index can be tied to other metrics used by an enterprise, such as metrics related to change requests or defects. For example, the quality index for a software development project can be compared to the number of defects that are found when the software is placed into production. Ideally, a correlation would be expected where a high quality index is associated with minimum number of defects and vice versa. If a strong correlation between the quality index and the number of defects is not found, the algorithms and calculations used to derive the quality index might be adjusted to improve the correlation.

In one embodiment, quality indices given to deliverables, steps, phases, or other portions of a project are fixed throughout the life of the project. Even if a defect is later corrected, the quality index associated with the defect cannot be changed. In another embodiment, when a defect is corrected, the quality index for the deliverable, step, phase, or other portion of a project with which the defect is associated is recalculated so that the quality index reflects the resolution of the defect.

A quality index can be calculated for projects and portions of projects that follow an enterprise development process (EDP). An EDP with which a quality index can be used is described in U.S. patent application Ser. No. 10/429,615, filed May 5, 2003 and entitled "Defining and Sizing Feasible Approaches to Business Needs Within an Integrated Development Process", and in U.S. patent application Ser. No. 10/643,334, filed Aug. 18, 2003 and entitled "Method For Discovering Functional and System Requirements In An Integrated Development Process", both of which are incorporated herein by reference. The EDP process described therein comprises five phases: Define, Discover, Design, Develop, and Deploy. An optional sixth phase is a Demand phase that addresses feedback for long-term optimization. FIG. 2 illustrates an embodiment of the EDP 20.

The Define phase 110 of the EDP 20 encompasses processes that define the strategic intent of an enterprise and concepts that are aligned with the strategic intent. Robust concept definition and ensuing communications ensure a proposed approach is on target with what a business wants delivered. Alignment with strategic network and IT architectures is also facilitated. As a side benefit, the Define phase 110 can reduce estimation time averages.

The Define phase 110 typically comprises four steps, Intent 112, Ideation 114, Feasibility 116, and Estimation 118. Intent 112 refers to processes that help define the business's strategic intent through the integration of mission, goal, objective, and capability models. Business-related decisions are made at this point without consideration of feasibility or design.

The Ideation step 114 encompasses formal and informal idea generation and the rigor of idea selection via validation against strategic intent. In the Ideation step 114, a problem is defined in the context of Intent 112 and a technical approach to the problem is developed. Ideation 114 also ensures that the definitions of concepts are aligned with the strategic intent.

The Feasibility step 116 facilitates determination of technical approach, critical functional impacts, impacted systems, and overall feasibility of concepts prior to Estimation 118. Customer expectations can be managed by determining if the customer's expected delivery date is feasible. Within the Feasibility step 116, a concept is typically reviewed for completeness and then classified according to size, complexity, and proposed process paths. The Feasibility step 116 is typically performed before an estimation of costs is made and before a solution is designed.

The Estimation step 118 facilitates estimation of level of effort (LOE) to aid with prioritization and investment decisions. An appropriate capacity of personnel, hardware, and other resources can be reserved as needed to complete a project.

The Discover phase 120 refers to the processes that help discover functional and system requirements in support of business requirements. The Discover phase 120 facilitates a "process-driven" approach to requirements gathering. The analysis conducted in the Discover phase 120 verifies the business processes envisioned and elicits all the requirements of the project. These requirements can be documented in a centralized repository along with the business and system process models, thus enabling traceability and reuse on subsequent projects. As a by-product of the Discover phase 120 analysis, it is possible to automatically generate interfaces as well as test workflows and test cases. These automation capabilities shorten the test window and overall project cycle time.

The Discover phase 120 is comprised of three steps, Project Planning 122, Functional Requirements Modeling (FRM) 124, and System Requirements Modeling (SRM) 126. Project Planning 122 encompasses all aspects of the planning for a project. FRM 124 facilitates identification of functional requirements, linked to supporting business requirements. Each functional requirement typically maps to a business requirement. Typically, no IT evaluation is done at this point. Automated solutions can be sought in the SRM step 126. SRM 126 facilitates identification of system requirements, linked to supporting functional requirements. Each system requirement typically maps to a functional requirement.

The Design phase 130 deals with the processes that constitute definition of physical design specifications and that will serve as the basis for development efforts. The Design phase 130 allows a consistent level of design detail across all development teams. This helps reduce the integration test window by enabling all development teams to develop to the correct interface specifications. Ultimately, this can result in shorter test windows and faster speed to market.

The Design phase 130 is comprised of two steps, Design Specification 132 and Contract 134. Design Specification 132 defines the inter-application physical design specification that becomes a common point of reference and binding for intra-application design. It encompasses physical information (data), environment, and security specifications. Design Specification 132 also defines the intra-application physical design specification encompassing physical information (database) design. Intra-application design specifications are determined, including the selection of user interfaces such as screen layouts, report layouts, and invoice mockups. Next, an application database design can be created, incorporating a database logical model, a database physical model, and data access mappings. The application design can then be validated against system requirements and capacities. Finally, a peer review can be conducted.

The Contract step 134 creates visibility and accountability to an integrated view of a project. A contract is an agreement between a contract sponsor and an appropriate IT entity and typically incorporates a scope of deliverables, a schedule, and a cost (LOE). After a contract has been assembled, an internal IT review can be conducted wherein an IT team can review and sign off on the contract. The contract is then offered to the sponsor and the sponsor reviews the project for approval.

The Develop phase 140 concerns the processes that create and test application systems and program code software according to the specifications detailed in the Design phase 130. The Develop phase 140 typically consists of two steps, Application Code and Testing 142 and Integrated Testing 144. Application Code and Testing 142 refers to processes for creating and testing application system source code according to design specifications and IT standards. Applicable levels of testing are encompassed within the confinement of the application system (e.g., unit, string, system).

Integrated Testing 144 refers to planning and execution of testing activities to ensure successful integration of application systems. Processes are performed that test the end-to-end business functionality across application systems. In the Integrated Testing step 144, a consolidated integration test plan can be created, including plans for inter-application connectivity testing, end-to-end testing, production-readiness testing, the test environment, test data, and automation tools.

The Deploy phase 150 involves processes for planning and implementing the activities required to migrate program code from the development environment to the production environment. The Deploy phase 150 typically encompasses two steps, Production Migration 152 and Production Warranty 154. Production Migration 152 defines the planning, execution, and verification activities required for migration from the development environment to the production (operational) environment.

Production Warranty 154 refers to the activities required during the transition period between deployment and on-going maintenance (also known as the warranty period) to ensure successful deployment. If a problem is identified in the warranty period, it is analyzed, isolated, and repaired. The repair is then verified and user acceptance is gained. The project can then be turned over to a production support group for ongoing maintenance and the project can be closed out.

When a quality index is used in conjunction with an EDP such as that described above, the calculation of a quality index could occur upon the completion of a deliverable. Quality checkpoints and calculations of additional quality indices might occur upon the completion of phases or steps within a phase. A graphical user interface might be associated with an EDP such as that described above and might display a scorecard such as that described above. Quality index-related values might be entered into the EDP graphical user interface and a quality index could be automatically calculated and associated with other data related to a project in a database of EDP data.

Figure 3:
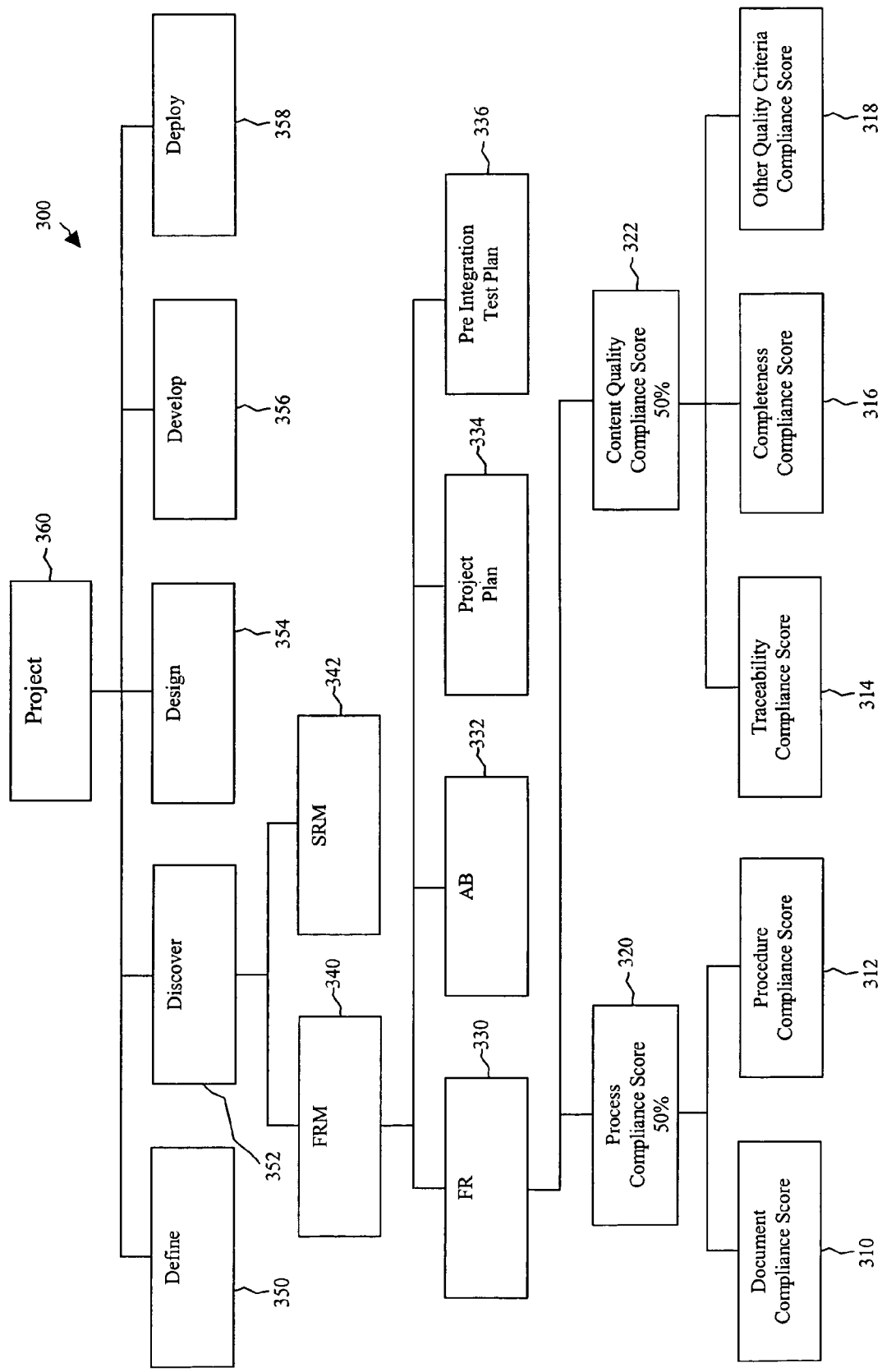
FIG. 3 is a diagram of a hierarchy of components for which a quality index can be calculated according to one embodiment of the present disclosure.

FIG. 3 illustrates a hierarchy 300 showing how the components that make up the quality index for a deliverable can lead to quality indices for steps, phases, and projects. In this example, the deliverable is referred to as FR 330 and it is part of the FRM step 340 in the Discover phase 352. Similar hierarchies would be used for other deliverables, steps, and phases.

In the embodiment of FIG. 3, a project 360 consists of a Define phase 350, a Discover phase 352, a Design phase 354, a Develop phase 356, and a Deploy phase 358. The Discover phase 352 consists of an FRM step 340 and an SRM step 342. The FRM step 340 consists of four deliverables: FR 330, AB 332, Project Plan 334, and Pre Integration Test Plan 336.

Two quality criteria, a Document Compliance Score 310 and a Procedure Compliance Score 312, are combined to give a Process Compliance Score 320. Three quality criteria, a Traceability Compliance Score 314, a Completeness Compliance Score 316, and an Other Quality Criteria Compliance Score 318, are combined to give a Content Quality Compliance Score 322. The Process Compliance Score 320 and the Content Quality Compliance Score 322 are combined to give a quality index for the FR deliverable 330. Similar procedures might be used to derive quality indices for the AB deliverable 332, the Project Plan deliverable 334, and the Pre Integration Test Plan deliverable 336.

The quality indices for the FR deliverable 330, the AB deliverable 332, the Project Plan deliverable 334, and the Pre Integration Test Plan deliverable 336 are combined to derive a quality index for the FRM step 340. Similar procedures could be used to derive a quality index for the SRM step 342. The quality indices for the FRM step 340 and the SRM step 342 are combined to give a quality index for the Discover phase 352. When similar procedures are used to derive quality indices for the Define phase 350, the Design phase 354, the Develop phase 356, and the Deploy phase 358, the quality indices for all of the phases can be combined to give a quality index for the project 360.

In an alternative embodiment, the quality index for a phase 350, 352, 354, 356, or 358 can be calculated by averaging the quality indices of all of the deliverables in the phase 350, 352, 354, 356, or 358 rather than by averaging the quality indices of all of the steps in the phase 350, 352, 354, 356, or 358. Other methods of deriving a quality index for a higher component in the hierarchy 300 from lower components in the hierarchy 300 will be apparent to one of skill in the art.

Figure 4:
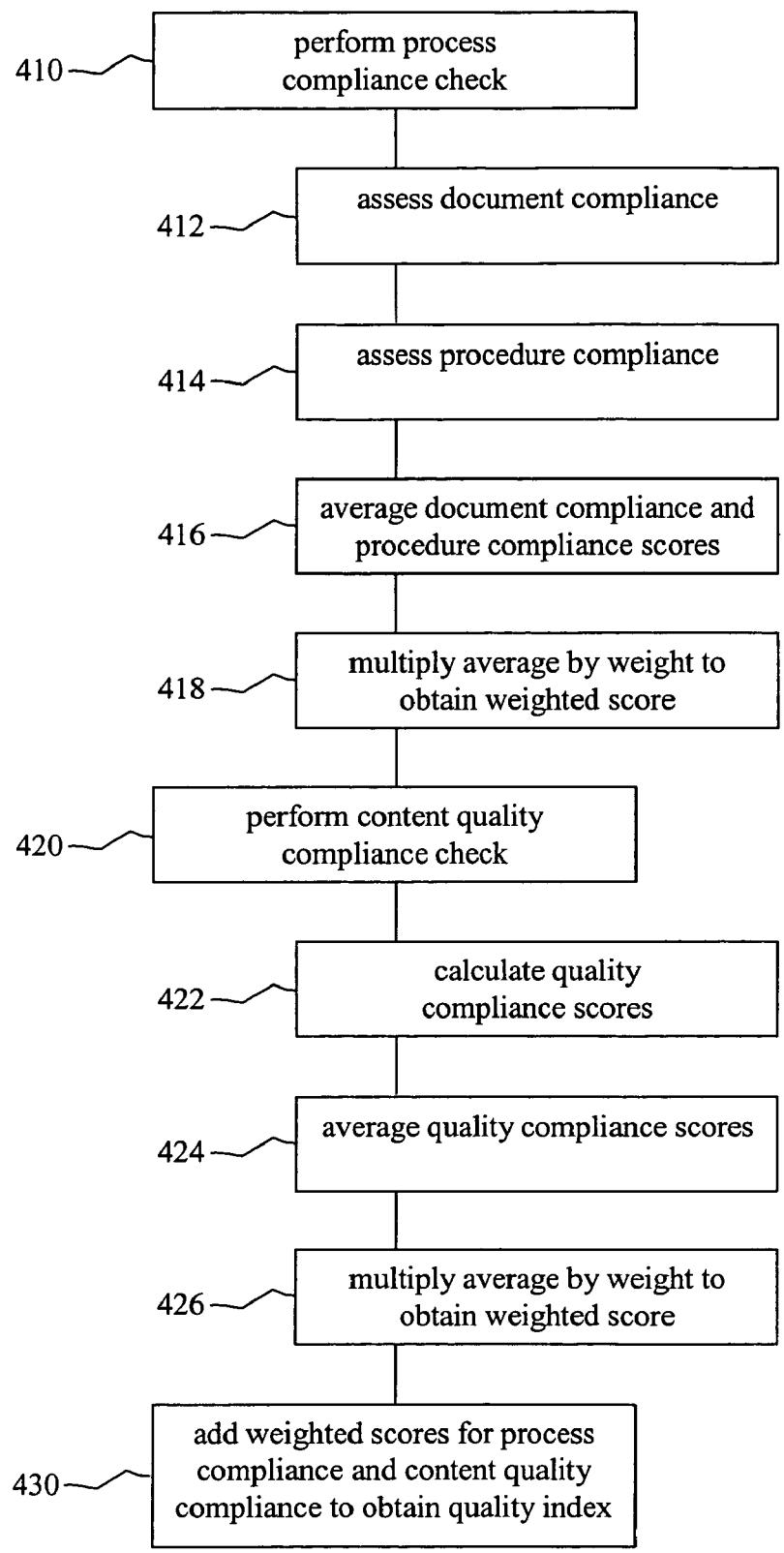
FIG. 4 is a flowchart of a method that might be used to calculate a quality index according to one embodiment of the present disclosure.

A method for determining a quality index is illustrated in FIG. 4. In box 410, a process compliance check is performed. The process compliance check consists of several steps, shown in boxes 412, 414, 416, and 418. In box 412, document compliance is assessed. This can consist of determining whether certain elements within a document are present and assigning one of two scores to each element to indicate whether or not the element is present. In box 414, procedure compliance is assessed. This can consist of determining whether certain procedures have been performed. One of two scores is assigned to each procedure to indicate whether or not the procedure has been performed. In box 416, the scores obtained in the document compliance assessment and the procedure compliance assessment are averaged to derive a process compliance average score. In box 418, the process compliance average score is multiplied by a weighting factor to derive a weighted score for process compliance.

In box 420, a content quality compliance check is performed. The content quality compliance check consists of several steps, shown in boxes 422, 424, and 426. In box 422, content quality compliance scores are calculated for several aspects of a deliverable. The calculation can be performed by determining the number of major, minor, and cosmetic defects for each aspect of the deliverable. The quantity of each type of defect can then be multiplied by a different weighting factor. The weighted quantities can then be added and the sum can be divided by the total number of requirements for the deliverable. The result can be converted to a score that reflects the degree to which an aspect of the deliverable meets its requirements. In box 424, the content quality compliance scores for the various aspects of the deliverable are averaged to derive a content quality compliance average score. In box 426, the content quality compliance average score is multiplied by a weighting factor to derive a weighted score for content quality compliance.

In box 430, the weighted score for process compliance and the weighted score for content quality compliance are added together to derive a quality index for the deliverable. Multiple deliverable quality indices can be averaged together to derive quality indices for phases of a project, steps of a phase, business units, suppliers, implementers, project or account managers, project types, or other views.

Figure 5:
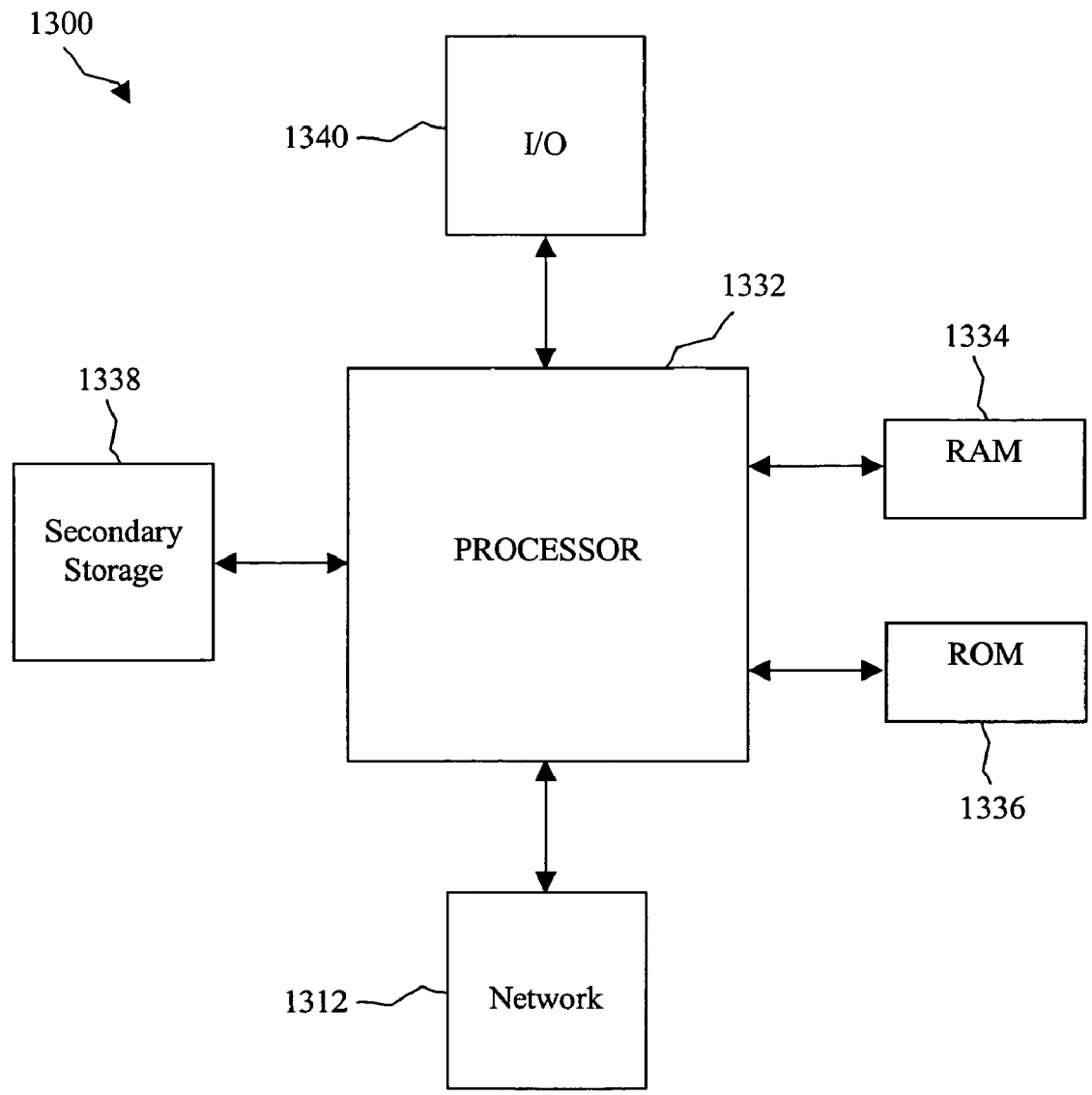
FIG. 5 is a block diagram of a computer system operable for some of the various embodiments of the present disclosure.

A quality index as described above may generally be implemented on a variety of different computer systems. FIG. 5 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Quality Index for Quality Assurance in Software Development may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A computer-implemented system for defining a quality index for a deliverable for a project comprising:
   an application stored in memory that, when executed by a processor,
      determines at least one process compliance score based on a corresponding process compliance aspect of the deliverable for the project,
      calculates a process compliance average score based on the at least one process compliance score,
      calculates a weighted process compliance average score by multiplying the process compliance average score by a first weighting factor,
      determines at least one content quality compliance score based on a corresponding content quality aspect of the deliverable for the project relative to the corresponding content quality aspect's satisfaction of a standard,
      calculates a content quality compliance average score based on the at least one content quality compliance score,
      calculates a weighted content quality compliance average score by multiplying the content quality compliance average score by a second weighting factor, and
      determines the quality index for the deliverable for the project based on adding the weighted process compliance average score and the weighted content quality compliance average score,
   wherein the application determines the at least one content quality compliance score by a formula comprising:
      multiplying a quantity of major defects in at least one of a plurality of content quality aspects of the deliverable by a major defect weighting factor to derive a first weighted defect score;
      multiplying a quantity of minor defects in the at least one content quality aspect of the deliverable by a minor defect weighting factor to derive a second weighted defect score;
      multiplying a quantity of cosmetic defects in the at least one content quality aspect of the deliverable by a cosmetic defect weighting factor to derive a third weighted defect score;
      adding the first, second, and third weighted defect scores to derive a sum;
      when the project is in a discover phase of an enterprise development process, dividing the sum by a quantity of requirements for the deliverable to derive a quotient, and when the project is in a phase other than the discover phase of the enterprise development process, dividing the sum by a quantity of function points in the phase to determine the quotient;
      multiplying the quotient by a factor to derive a product; and
      subtracting the product from a maximum possible score.

2. The system of claim 1, wherein at least two quality indices for deliverables are averaged to derive a quality index for a component of the project.

3. The system of claim 1, wherein the project is a software development project.

4. The system of claim 1, wherein the project follows an enterprise development process comprising:
   a define phase in which a strategic intent of an enterprise and a concept that is aligned with the strategic intent are defined;
   a discover phase in which an analysis of a functional requirement for the project and an analysis of a system requirement for the project are performed;
   a design phase in which a physical design specification that will serve as a basis for a development effort is created;
   a develop phase in which software is created and tested according to the specification created in the design phase; and
   a deploy phase in which the software is migrated from a development environment to a production environment.

5. The system of claim 4, wherein a decision on whether to proceed with the project is at least partially based on the quality index.

6. The system of claim 1, wherein the application comprises a graphical user interface, wherein the application determines the at least one process compliance score based on process compliance input received by the graphical user interface, and wherein the application determines the at least one content quality compliance score based on content quality compliance input received by the graphical user interface.

7. The system of claim 6, wherein the process compliance input comprises a document compliance portion and a procedure compliance portion.

8. The system of claim 1, wherein the application determines a process compliance score based on one of the process compliance aspects that is partially complete.

9. The system of claim 1, wherein the at least one content quality compliance aspect is selected from a group consisting of:
   a completeness aspect;
   a traceability aspect;

a readability aspect;
an accuracy aspect;
a testability aspect;
a consistency aspect;
an efficiency aspect;
a flexibility aspect;
a maintainability aspect;
a portability aspect; and a usability aspect.

10. A method for determining a quality index for a deliverable for a project comprising:
performing a process compliance check wherein at least one process compliance aspect of the deliverable is given a first score when the process compliance aspect is satisfied, a second score when the process compliance aspect is not satisfied, and a third score indicating that the process compliance aspect is partially complete;
calculating, by an application stored in memory and executing on a processor, a process compliance average score based on at least one score obtained in the process compliance check;
calculating, by the application, a weighted process compliance average score by multiplying the process compliance average score by a first weighting factor;
performing a content quality compliance check wherein at least one content quality aspect of the deliverable is given a score that reflects the degree to which the content quality aspect meets its standards;
calculating, by the application, a content quality compliance average score based on at least one score obtained in the content quality compliance check;
calculating, by the application, a weighted content quality compliance average score by multiplying the content quality compliance average score by a second weighting factor; and
calculating, by the application, the quality index by adding the weighted process compliance average score and the weighted content quality compliance average score,
wherein a score obtained in the content quality compliance check is calculated by a formula comprising:
multiplying, by the application, a quantity of major defects in a content quality aspect of the deliverable by a major defect weighting factor to derive a first weighted defect score;
multiplying, by the application, a quantity of minor defects in the content quality aspect of the deliverable by a minor defect weighting factor to derive a second weighted defect score;
multiplying, by the application, a quantity of cosmetic defects in the content quality aspect of the deliverable by a cosmetic defect weighting factor to derive a third weighted defect score;
adding, by the application, the first, second, and third weighted defect scores to derive a sum;
when the project is in a discover phase of an enterprise development process, dividing, by the application, the sum by a quantity of requirements for the deliverable to derive a quotient, and when the project is in a phase other than the discover phase of the enterprise development process, dividing, by the application, the sum by a quantity of function points in the phase;
multiplying, by the application, the quotient by a factor to derive a product; and
subtracting, by the application, the product from a maximum possible score.

11. The method of claim 10, wherein at least two quality indices for deliverables are averaged by the application to derive a quality index for a component of the project.

12. The method of claim 10, wherein the project is a software development project.

13. The method of claim 10, wherein the project follows an enterprise development process comprising:
a define phase in which a strategic intent of an enterprise and a concept that is aligned with the strategic intent are defined;
a discover phase in which an analysis of a functional requirement for the project and an analysis of a system requirement for the project are performed;
a design phase in which a physical design specification that will serve as a basis for a development effort is created;
a develop phase in which software is created and tested according to the specification created in the design phase; and
a deploy phase in which the software is migrated from a development environment to a production environment.

14. The method of claim 13, wherein a decision on whether to proceed with the project is at least partially based on the quality index.

15. The method of claim 14, wherein the information related to the quality index is entered into a graphical user interface associated with the enterprise development process, the quality index is automatically calculated by software associated with the enterprise development process, and the quality index is associated with other data related to the project.

16. The method of claim 10, further comprising using the quality indices from a plurality of projects to monitor enterprise quality trends.

17. The method of claim 10, wherein the first and second weighting factors are based on a relevance of the process compliance portion and the content quality compliance portion.

18. The method of claim 10, further comprising using the quality index to evaluate how well an enterprise is meeting a Capability Maturity Model Integration guideline.

* * * * *